US008576878B2

(12) United States Patent
Schroderus

(10) Patent No.: US 8,576,878 B2
(45) Date of Patent: Nov. 5, 2013

(54) METHOD FOR CONTROLLING PARTIES IN REAL-TIME DATA COMMUNICATION

(75) Inventor: Osmo Schroderus, Sumiainen (FI)

(73) Assignee: Nokia Corporation, Espoo (FI)

( * ) Notice: Subject to any disclaimer, the term of this patent is extended or adjusted under 35 U.S.C. 154(b) by 2246 days.

(21) Appl. No.: 10/160,272

(22) Filed: Jun. 4, 2002

(65) Prior Publication Data

US 2003/0223381 A1 Dec. 4, 2003

(51) Int. Cl.
*H04J 3/24* (2006.01)

(52) U.S. Cl.
USPC ............ 370/473; 370/389; 370/352; 370/401

(58) Field of Classification Search
USPC ................. 370/473–474, 389, 328, 352, 401; 714/748, 47; 455/519, 517, 521; 340/7.43
See application file for complete search history.

(56) References Cited

U.S. PATENT DOCUMENTS

| 5,375,068 | A | 12/1994 | Palmer et al. |
| 5,809,018 | A | 9/1998 | Lehmusto |
| 5,809,019 | A | 9/1998 | Ichihara et al. |
| 5,812,791 | A | 9/1998 | Wasserman et al. |
| 6,141,347 | A | 10/2000 | Derango et al. |
| 6,141,777 | A * | 10/2000 | Cutrell et al. .................. 714/47 |
| 6,181,685 | B1 | 1/2001 | Chinitz et al. |
| 6,275,471 | B1 * | 8/2001 | Bushmitch et al. ............ 370/248 |
| 6,323,754 | B1 * | 11/2001 | Simons ........................ 340/7.43 |
| 6,484,196 | B1 * | 11/2002 | Maurille ........................ 709/206 |
| 6,912,402 | B1 * | 6/2005 | Haumont et al. ............. 455/519 |
| 7,058,042 | B2 * | 6/2006 | Bontempi et al. ............ 370/338 |
| 7,197,571 | B2 * | 3/2007 | Sarkar et al. .................. 709/237 |
| 7,386,000 | B2 * | 6/2008 | Lopponen et al. ............ 370/433 |
| 2002/0150092 | A1 * | 10/2002 | Bontempi et al. ............ 370/389 |
| 2002/0191643 | A1 * | 12/2002 | Yun et al. ..................... 370/474 |
| 2003/0103521 | A1 * | 6/2003 | Raphaeli et al. .............. 370/445 |
| 2005/0002365 | A1 * | 1/2005 | Xu ................................. 370/338 |
| 2006/0190610 | A1 * | 8/2006 | Motegi et al. ................. 709/228 |

FOREIGN PATENT DOCUMENTS

| WO | WO 02/01780 A2 | 1/2002 |
| WO | WO 02/085051 A1 | 10/2002 |

OTHER PUBLICATIONS

Hong et al., "Distributed Real-time Simulation of the Group Manager Executing the Multicast protocol RFRM," Proceedings of ISORC 2002, IEEE, p. 173-176, (Apr. 29, 2002).
Ring, Steffen et al., "Digital Advanced Wireless Services (DAWS): The ETSI Standardization of the next generation mobile platform for Public Safety, Law Enforcement and non-tactical Military," EUROCOMM 2000, Information Systems for Enhanced Public Safety and Security, IEEE/AFCEA, p. 355-358, (May 17, 2000).

(Continued)

*Primary Examiner* — Chuong T Ho
(74) *Attorney, Agent, or Firm* — Ditthavong, Mori & Steiner, P.C.

(57) ABSTRACT

The invention relates to communications systems, and especially to real-time data (two-party or multi-party) communication in communications systems. A real-time data item is sent from a sending terminal to a number of receiving terminals over a communication system. In accordance with the present invention, each receiving user terminal acknowledges the reception of the item by sending an item acknowledgement report after the end of the item. The acknowledgement report may be sent after a successful reception of the item, unsuccessful reception of the item or in both cases.

15 Claims, 7 Drawing Sheets

(56) References Cited

OTHER PUBLICATIONS

On, Byung-Won et al., "A Hierarchical Ack-Based Protocol for Reliable Multicast in Mobile Networks," Networks 2000 (ICON 2000), IEEE Proceedings, p. 359-362, (Sep. 5, 2000).

On, Byung-Won et al., "A Reliable Multicast Protocol in Networks with Mobile Hosts," Proceedings, International Symposium on Distributed Objects and Applications 2000, DOA'00, p. 27-35, (Sep. 21, 2000).

European Examination Report dated Dec. 1, 2008 in corresponding foreign application, 8 pp.

* cited by examiner

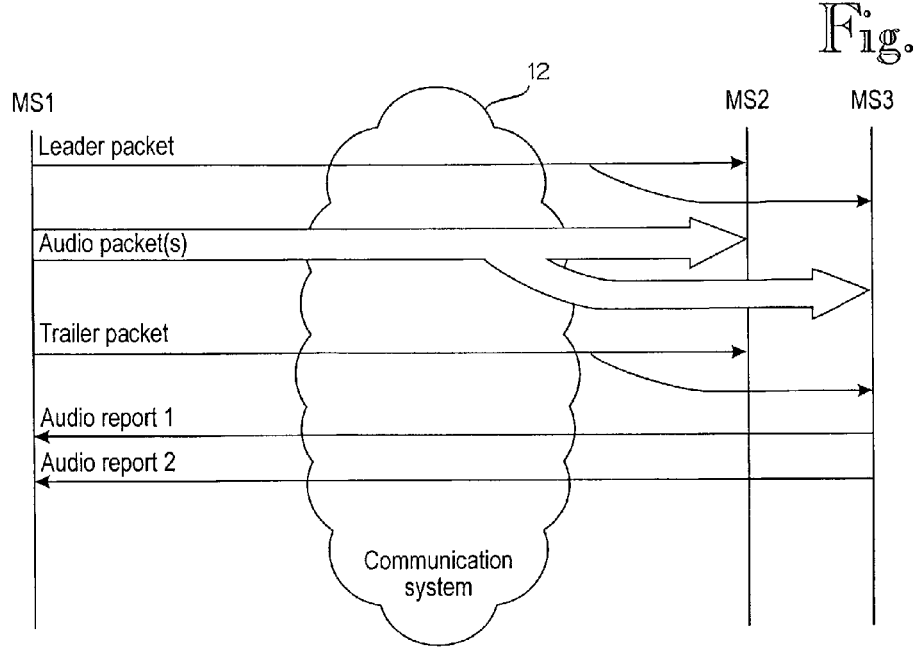
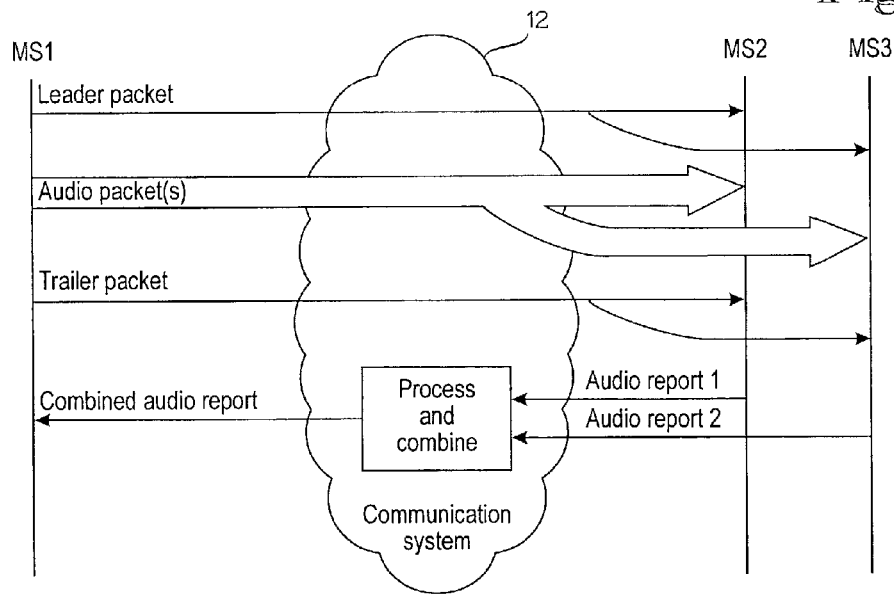

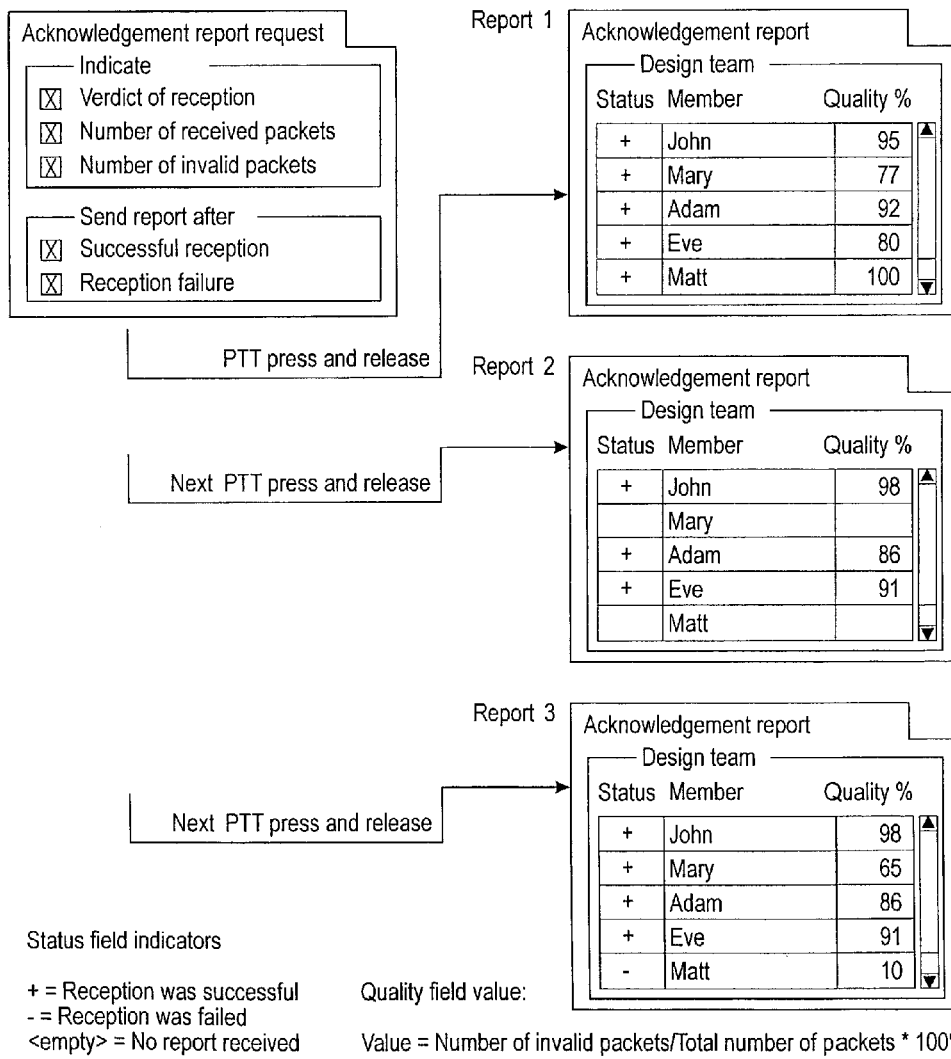

A = Version of acknowledgement report request = 00 = v1.0
V = Indicate the verdict of reception, 0=Off, 1=On
P = Indicate the total number of received packets, 0=Off, 1=On
I = Indicate the number of invalid packets, 0=Off, 1=On
S = Send report after successful reception, 0=Off, 1=On
F = Send report after reception failure, 0=Off, 1=On
r = reserved = 0

METHOD FOR CONTROLLING PARTIES IN REAL-TIME DATA COMMUNICATION

FIELD OF THE INVENTION

The invention relates to communications systems, and especially to real-time data (two-party or multi-party) communication in communications systems.

BACKGROUND OF THE INVENTION

The most common call type is a call established between two parties for one-to-one communication. The standard way to set up a two-party call requires explicit control plane signalling that allows the call parties to establish a channel where the audio data can be transferred and to negotiate the communication capabilities; for example, the audio codec and the relative compression rate can be determined in this phase. Afterwards the actual voice communication can start and the audio data can be transmitted by the call parties.

Voice over Internet Protocol (VoIP) enables a speech communication over an IP connection. The Session Initiation Protocol (SIP, RFC 2543) is conventionally used for call establishment in "VoIP" based communication systems.

A mobile communications system refers generally to any telecommunications system which enables communication when users are moving within the service area of the system. A typical mobile communications system is a Public Land Mobile Network (PLMN). Often the mobile communications network is an access network providing a user with wireless access to external networks, hosts, or services offered by specific service providers.

Professional mobile radio or private mobile radio (PMR) systems are dedicated radio systems developed primarily for professional and governmental users, such as the police, military forces, oil plants, etc. PMR services are offered via dedicated PMR networks built with dedicated PMR technologies. This market is divided between several technologies—analog, digital, conventional and trunked—none of which has a dominating role. TETRA (Terrestrial Trunked Radio) is a standard defined by ETSI (European Telecommunications Standards Institute) for digital PMR systems.

One special feature offered by the PMR systems is group communication. The term "group", as used herein, refers to any logical group of three or more users intended to participate in the same group communication, e.g. a call. Group communication with a push-to-talk feature is one of the essential features of any PMR network. Generally, in group voice communication with a "push-to-talk, release-to-listen" feature, a group call is based on the use of a pressel (PTT, push-to-talk switch) in a telephone as a switch: by pressing a PTT the user indicates his desire to speak, and the user equipment sends a service request to the network. The network either rejects the request or allocates the requested resources on the basis of predetermined criteria, such as the availability of resources, priority of the requesting user, etc. At the same time, a connection is established also to all other active users in the specific subscriber group. After the voice connection has been established, the requesting user can talk and the other users can listen on the channel. When the user releases the PTT, the user equipment signals a release message to the network, and the resources are released. Thus, the resources are reserved only for the actual speech transaction or speech item, instead of reserving the resources for a "call". One interesting advantage of the push-to-talk communication, or more generally speech-item-by-speech-item communication, is a short call setup time, which also makes such speech communication attractive to several other types of users. U.S. Pat. No. 6,141,347 discloses a wireless communications system which uses multicast addressing and decentralized processing in group calls.

A problem with such item-by-item communication is that a strict discipline or protocol is required from the parties in the speech communication, or other type of real-time data communication. Further, especially in group communication, it is difficult to know which the parties of the communication are at each specific moment, and therefore the communication must include spoken questions and acknowledgements.

SUMMARY OF THE INVENTION

An object of the invention is to provide a new way to control parties in an item-by-item real-time data communication.

This object of the invention is achieved by methods, systems and terminals as defined in the attached independent claims. Various embodiments of the invention are defined in the attached dependent claims.

In the present invention, each receiving user terminal acknowledges the reception of a real-time data item by sending a real-time data item acknowledgement report after the end of the item. In an embodiment of the invention, the acknowledgement report may be sent after a successful reception of real-time data item, unsuccessful reception of real-time data item or in both cases, depending on the implementation and/or the user's selection. In an embodiment of the invention, the report may also contain information relating to the quality of the connection. In an embodiment of the invention, the receiving terminal sends an acknowledgement report only in response to a specific request sent by the sending user terminal from which the real-time data item originated, and no report is sent otherwise. This embodiment allows unnecessary reports to be avoided if the sending party is not interested in them. In another embodiment of the invention, the report is sent as a default. In an embodiment of the invention, each acknowledgement report is forwarded over a communication system to the sending user terminal from which the real-time data item originated. In this embodiment, no extra functionality is needed in the communication system infrastructure for the present invention. In another embodiment of the invention, a communication system infrastructure collects acknowledgement reports from a plurality of receiving user terminals and sends a combined acknowledgement report to the sending user terminal from which the real-time data item originated. This embodiment requires extra functionality in the communication system infrastructure for the invention but, on the other hand, requires less transmission capacity. When the sending user terminal receives the acknowledgement report(s) after the real-time data item has ended, it may display information which indicates to a sending user which terminal(s) or user(s) were receiving the previous real-time data item. Thus, the present invention alleviates the problem of knowing who actually received the transmitted real-time data. With the present invention, the sending user automatically knows who received the previous real-time data item. Consequently, the users are no longer required to give this information themselves, as is the case in the prior art systems.

In an embodiment of the invention, embedded (i.e. implicit) signalling in a real-time data traffic is employed for transferring a request for an acknowledgement report and/or the acknowledgement report(s). Embedded signalling makes it unnecessary to reserve another bearer for the control signalling, which saves network resources and allows a short connection setup time to be achieved. In another embodiment, the acknowledgement report(s) is transferred using outband signalling, such as SIP signalling.

In some embodiments of the invention, packet mode speech communication is employed, such as Internet Protocol (IP) packets or VoIP speech communications.

In an embodiment of the invention, the embedded signalling comprises sending a leader packet from a sending user terminal to at least one receiving user terminal. The leader packet starts a real-time data item. In an embodiment of the invention, the leader packet is employed for requesting the receiving user terminal(s) to send an acknowledgement report when the respective real-time data item has ended. After the leader packet, audio packets that may contain no signalling but may contain only part of the real-time data item are sent. A trailer packet is the last part of the real-time data item and may be used by the receiving user terminal(s) to detect the end of the real-time data item.

BRIEF DESCRIPTION OF THE DRAWINGS

In the following, the invention will be described in greater detail by means of preferred embodiments and with reference to the accompanying drawings, in which

FIGS. 6 and 7 are messaging charts illustrating two examples of transferring a leader packet, audio packets, trailer packet and acknowledgement reports through a communication system;

FIG. 8 shows an example of an acknowledgement report activation menu that may be displayed to the user, FIG. 9 shows an example of an acknowledgement report displayed to the user;

PREFERRED EMBODIMENTS OF THE INVENTION

The present invention is applicable to any communications system allowing real-time data communication between end users on the item by item basis. The real-time data may include real-time audio (e.g. speech), real-time video, or any other real-time data, or combination thereof, i.e. real-time multimedia.

The present invention is especially applicable to any communications system allowing packet-mode real-time data communication, such as IP packet communication between end users. Thus, the real-time data communication may be carried out between end user terminals over the Internet, for example.

The present invention offers a significant improvement for packet-mode speech communications. In some embodiments of the invention, the IP voice communication method employed is the Voice over IP (VoIP), but the invention is not limited to this particular method.

One application field of the invention is in mobile packet radio communications systems. In the following, embodiments of the invention will be described by means of a GPRS type packet radio service and the UMTS or GSM system, without limiting the invention to these communication systems.

Figure 1:
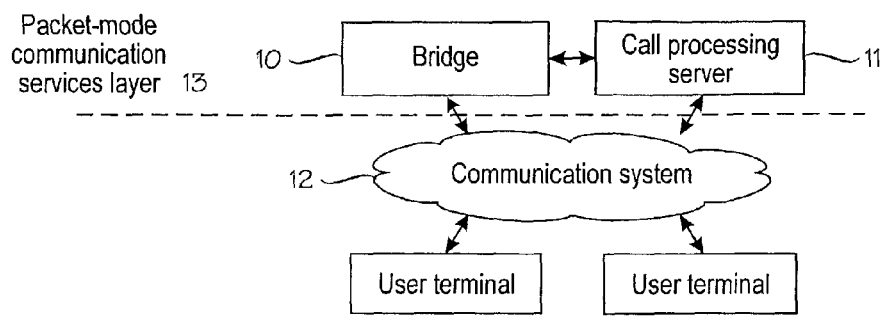
FIGS. 1 and 2 show block diagrams illustrating examples of a communication system whereto the present invention can be applied.

FIG. 1 illustrates an example wherein a packet mode speech communication service is embodied within a server based core network (CN) with different control and user-plane's logical entities serving the subscribers connected thereto. This concept and architecture is illustrated in more detail in the copending U.S. patent application Ser. Nos. 09/835,867 and 09/903,871 which are incorporated herein by reference. The subscribers' transmissions are proxied and forwarded by these CN entities, which do not allow direct end-to-end transmissions between the subscribers. It should be appreciated that call processing servers (CPS) and user-plane functions (Bridge) may also be within the access communication network, providing a top protocol layer for the access network.

The communication system 12 may be a mobile radio access network (RAN) which provides the IP packet data service which may be based on a GPRS architecture utilizing a second generation (2G) or third generation (3G) radio access technology. Similarly, any communication system supporting a packet mode voice communication can be employed instead of the mobile network described above. It should be appreciated that the type of the underlying network layer (i.e. "the access network") is not essential to the basic invention. Some embodiments of the invention can be embodied in the end-user terminals without any supporting functionality on the network side.

In FIG. 1, a packet mode voice communication layer 13 (or a core network CN) is provided on top of the mobile network in order to provide communication services to the user terminals through the communications system, e.g. mobile network. This layer can be called a Push-to-talk over Cellular (PoC) layer. Conceptually, the packet mode voice communication layer 13 may comprise a pair of basic logical entities, a bridge 10 and a call processing server (CPS) 11. The bridge 10 and the CPS server 11 run packet mode voice communication applications, which communicate with the packet mode voice communication application(s) in the user terminals over the IP connections provided by the IP communication system. This communication includes both signalling packets and voice (group or one-to-one) communication packets.

The CPS 11 may be responsible for control-plane management of the packet mode voice communications. Its important role may require various functionalities, managing the user activity and creation and deletion of logical user-plane connections with an appropriate control protocol, such as Session Initiation Protocol SIP, and management of the user profiles (call rights, group active membership, scanning settings, etc.); SIP Proxy/Location Server—providing user location and routing functionalities of SIP signalling; SIP Registrar—for user registration/authentication; and Media Gateway Controller—controlling the network entities (PoC bridges) involved in the IP layer data distribution according to the group & user specific information (membership, rights, scanning settings, etc.). However, as used herein, the common term CPS refers to all possible functionalities of the CPS.

Figure 2:
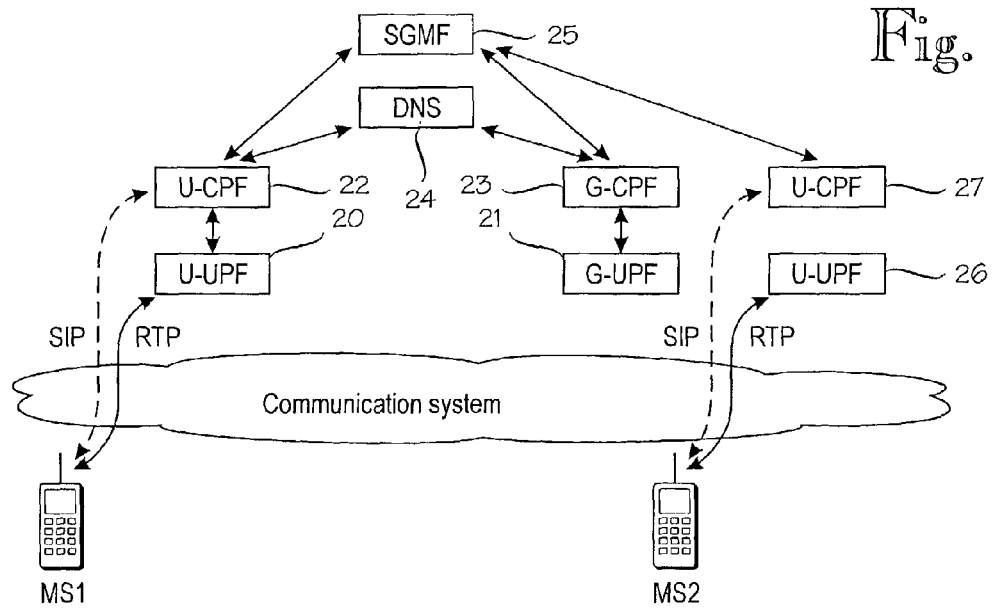

Referring to a further embodiment shown in FIG. 2, since the PMR management requirements can be divided into group and user specific ones, there may be two kinds of CPS.

The SIP sessions for group communications are handled by a Group Control Plane Function (G-CPF) 23 (e.g. in a server). When a user connects to a group, the G-CPF 23 takes care of the relative SIP invitation transaction and performs the proper mapping settings between the user's recipient and the network entities responsible for the relative traffic distribution. The User-Control Plane Function (U-CPF) 22 (e.g. a control plane proxy server) is basically the control plane interface between the IP network and the user (in FIG. 2, U-CPF 22 is provided for the MS1 and UCPF 27 is provided for MS2). By this network entity, the users log on to the system and negotiate their operational settings (scanning settings, selected group etc.). It handles the user's profile and manages his or her one-to-one calls. It should be appreciated that this is just a logical separation, and both kinds of CPS can be situated in the same computer. Separating G-CPF and UCPF enables users to join PoC groups handled by G-CPF in different intranets or in mobile networks of different operators and IP domain. The division also brings scalability by allowing, in practice, an infinite number of groups or users in the system. A Subscriber and Group Management Function (SGMF) 25 may be provided for managing the subscriber and group data. The end users or other users may connect to the SGMF 25 using any communication method. In an embodiment of the invention, the control interface is WWW based and accessible using a standard web browser.

Referring again to FIG. 1, the bridge 10 is responsible for the real-time distribution of VoIP packets to the users' terminals according to their group memberships, their scanning settings and eventual pre-emption or emergency cases. Each bridge forwards traffic only between valid connections programmed by the CPS. The bridge 10 may perform one or more of the following functionalities.

Input checking: to identify and authenticate the traffic source (optionally the mnemonics in the leader RTP packet, which will be discussed below, have to be processed here). Input checking may also include actions to perform and support security procedures.

Input filtering: to manage that only one talker talks in a group at a time (i.e. grants a speech item), and optionally to give priority to higher priority voice items.

Multiplication: after the filtering process, the bridge 10 has to check the active members of the group to which the traffic is destined and generate from the incoming packet a "downlink" packet for each active member.

Scanning filtering: to select from among the multiple incoming traffic streams destined to the same user the one which has to be forwarded to his recipient according to the user's scanning settings.

Again, since input filtering and multiplication are group specific processes, while input checking and scanning filtering are user specific, the bridge may comprise two logical parts, as illustrated in FIG. 2.

Firstly, a Group-User Plane Function (G-UPF) G-UPF 21 (e.g. in a server) is a network entity to which group members' audio packets are sent (through their U-UPF) and where the input filtering and multiplication processes are performed. To each new group, the G-CPF 23 assigns a single G-UPF 21 according to load balancing criteria which distribute the traffic between the G-UPFs as evenly as possible.

The User-User Plane Function (U-UPF) U-UPF 20 (e.g. in a server) performs the input checking and scanning processes for the individual subscribers assigned to it by the U-CPF 22 (In FIG. 2, the U-UPF 20 is provided for the MS1 and U-UPF 26 is provided for MS2). For security purposes, the U-UPF 20 may have security associations for each mobile terminal it handles. The U-UPF 20 hides the network complexity from the mobile terminals, so the user only has to send all of his user plane traffic to this unit that afterwards forwards it according to the mapping settings of the proper U-CPF 22. In this way, there is no need to establish secure channels between each user and all the IP network entities which only have to trust the U-UPF 20 from which they receive packets.

As for the Control Plane elements, this logical splitting does not necessarily require a physical separation between the G-UPF and the U-UPF implementations, and thus they may be located in the same computer.

The U-CPFs 22 and 27, which are responsible for managing the sessions of the users, may require specific control plane signalling. ETSI 3GPP (European Telecommunications Standards Institute, 3rd Generation Partnership Project) specifications include IP based voice communications in a so-called all-IP network. Such an all-IP network enables also voice communication in IP network (voice over IP, VoIP). For VoIP, call control signalling is specified, such as the Session Initiation Protocol (SIP), which is defined in the RFC 2543.

However, some other IP session protocol can be used instead. For example, Megaco (defined in RFC 3015) may be used by the UCPFs 22 and 27 to control the U-UPFs 20 and 26 involved in traffic distribution of the IP layer. However, some other corresponding protocol for controlling the switching of the user-plane elements may be used instead. Still further, the RTP (Real Time transport Protocol, defined in RFC1889)) may be chosen to handle the transfer in the preferred embodiment, and QoS mechanisms may be used to handle the voice packet (VoIP) delivery.

The Real-Time Transport Protocol (RTP) developed by the IETF to support the transport of real-time streams for audio communications over packet networks may be used on top of the UDP in order to avoid the delays introduced by more reliable transport protocols (not required in this context), such as the TCP. With the RTP and latency buffering at the receiving endpoint, the timing Oitter problem), packet ordering, synchronization of multiple streams, duplicate packet elimination and continuity of the streams can be handled.

The SIP protocol defines signalling messages for call control, user location and registration, and these may be used to handle the specific voice communications and the relative participating users (establishment, joining and tear down of a call session, user's log on to the services, user's profile negotiation, etc).

For each communication, a SIP session is established and managed by the CPS handling it (G-CPF 23 and U-CPF 22/27 for group and one-to-one communications respectively). When a user wants to become an active member of a group, he has to join the corresponding session. For one-to-one calls, the PoC U-CPFs maintain one session between participating UCPFs for each one-to-one call.

All the user's outgoing and incoming traffic has to go through the U-UPF 20/26 that has been assigned to the user. In particular, in the uplink the user's traffic is checked by his U-UPF 20/26 and forwarded to the G-UPF 21 handling the group to which the traffic is destined or, in the case of one-to-one communication, to the U-UPF 20/26 handling the called party.

In the downlink, the traffic is then distributed to the destination users' U-UPFs 20/26 (by packet multiplication in the G-UPF 21 in the case of group communication, packets are multiplied and forwarded to each U-UPF which is serving active members in the group). In the U-UPF, the users' scanning processes are performed and traffic is multiplied and forwarded to each user that listens to the group according to his current scanning settings.

This PoC approach is access independent, which means that it can run on top of GSM, WCDMA, WLAN or equivalent technologies as long as these are able to support the always-on VoIP bearers. The IP layer's audio distribution uses standard VoIP mechanisms (such as the RTP), while specific Internet protocols or interfaces will be used to connect supplementary network entities, such as Subscriber and Group Management Function (SGMF) 25, a Domain Name Server (DNS) 24, WWW/WAP (World Wide Web/Wireless Application Protocol) and security management servers. Each network entity is obviously associated with at least one IP address by which the IP packets are transferred and routed, but the role of the network elements have also to be defined from the SIP's point of view. Each MS is a SIP User Agent (UA), and thus each one has a SIP address (URL) which normally is "username@hostname" where the hostname can be, but not necessarily is, associated with the U-CPF 22/27 in which the MSs have to register. This UCPF 22/27 may act as a Registrar, Location and Proxy SIP server in order to allow the reachability of the MSs under his control and to support the SIP signalling routing. The G-UPFs 21 and U-UPFs 20/26, which are exclusively involved in the audio data distribution, do not have a role in the actual SIP mechanisms and the core network is simply seen as a single IP network link. At the SIP signalling level, URLs are used for user and group identification. The URLs can be sip: URLs as defined in the RFC 2543, tel: URLs representing telephone numbers as defined in the RFC 2806, or any other URL formats. The REGISTER method is used with a sip: URL, that is, SIP URL is the user main identity in PoC system. Dialling of users with a private numbering plan number (only) is possible using the tel: URL in the To: header field (sip: URL must have the host portion present at all times). A secondary identity can be used for example for addressing the b-party for one-to-one calls if the b-party is from the same Virtual Private Network (VPN). Groups may be addressed with sip: URLs, where the group name is used in place of the user name, and the host managing the group (exact G-CPF, if known) in the host portion.

The user equipment, or mobile station MS, may have a packet mode voice communication application on a user layer on top of the standard protocol stack used in the specific mobile communications system. The SIP and RTP protocols employ the underlying TCP, UDP and IP protocols, which further employ the physical layer resources, such as the radio resources. It can be assumed that at least in the users' terminals the IPv6 is implemented, while in some core network entities it could be required to support the IPv4 also (dual IPv6/v4 stack) in order to assure the interoperability with eventual sub-networks still using it. The MS, when the packet mode voice communication mode is selected by the user, sets up two GPRS contexts: a) one to be used for control plane signalling (SIP/UDP/IP), b) one for real-time audio streams (RTP/UDP/IP) with conversational IP quality class or the like, and sufficient header compression over the radio path. The RTP/UDP/IP protocol stack is commonly used in the VoIP world for real-time audio data transmission, and it is thus selected for the user-plane in the preferred embodiment of the invention as well. If a mobile or the mobile network does not support two simultaneous contexts, the mobile may clear down the RTP connection for the duration of the SIP signalling transaction. The MS must always maintain the contexts for the bridge 10 when the packet mode voice communication mode is on; The SIP context is also preferably on all the time, but if this causes problems to network capacity, the SIP context can be set up also for the duration of signalling transactions. In such a case, the cellular network may support the network-initiated context set up. The SIP sessions are signalled in power on or in packet mode voice communication mode activation. The SIP sessions are always on and thus no SIP signalling is needed for packet-mode voice items. All voice is transmitted after PTT activation or any other suitable manual or voice activation (such as voice activity detection, VAD) via the existing contexts.

Figure 3:
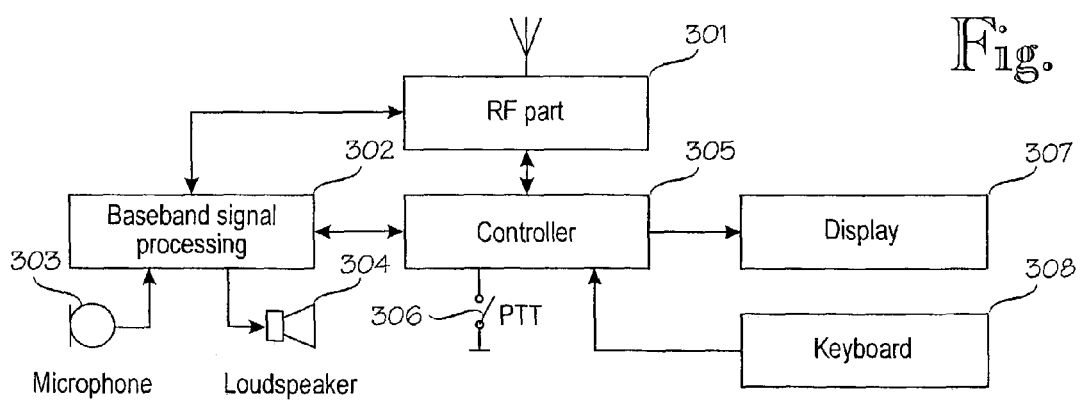
FIG. 3 is a simplified block diagram illustrating an example of a user terminal whereto the present invention can be applied.

An example of a possible implementation of a mobile station MS is illustrated in a simplified block diagram shown in FIG. 3. An RF part 301 represents any radio frequency function and hardware required by a specific air interface employed. The actual implementation of the RF part 301 is not relevant to the present invention. A baseband signal processing 302 represents any baseband signal processing required in any specific implementation, such as an analog-digital (A/D) conversion of the analogue speech signal from the microphone 303, vo-encoding, IP packet building, frame building, deframing, IP packet debuilding, vo-decoding, a digital-analog (D/A) conversion of the received digital speech signal into an analog signal applied to a loudspeaker 304. The RF part 301 and the baseband signal processing 302 are controlled by a controller 305. The controller 305 controls the signalling, both outband (SIP) and embedded, as well as IP packet building and debuilding. Start and stop of the speech items are set by the PTT switch 306 which can be replaced by any user-operated device, e.g. a voice activity detector (VAD). Such alternative mechanisms for starting and ending a speech item instead of the PTT are-obvious to a person skilled in the art. A user interface may include a display 307 and a keyboard 308. It should be appreciated that the blocks illustrated in FIG. 3 are functional blocks which can be implemented in a variety of different circuit configurations. For example, the baseband processing and the controller may implemented in a single programmable unit (e.g. a CPU or a signal processor) or in a plurality of units. The operation according to the present invention is primarily related to the controller part of the MS, and the basic invention may be implemented as program modifications in the control program of the MS, for example. It should also be appreciated that the present invention is not intended to be restricted to mobile stations and mobile systems but the terminal can be any terminal having a speech communication capability. For example, the user terminal may be a terminal (such as a personal computer PC) having Internet access and a VoIP capability for voice communication over the Internet.

However, the operation of the present invention is illustrated in connection with the PoC architecture described above, without restricting the invention to this specific system. When a call party has a logical connection, the actual communication path, including the channel resources at the sending and receiving ends, needs to be opened and the resources to be reserved only for the duration of the talk item. Call set-up signalling, authentication, agreement on encryption keys and negotiation over service parameters are not needed in the resource reservation phase because the logical connections already exist, but the physical resources are reserved and opened by using the signalling procedures. Thus, short connection set up times can be achieved. In an embodiment which uses VoIP based communication, the inventive concept means that embedded signalling in the Real-time Transport Protocol (RTP) packets will suffice without time consuming SIP signalling. Specific RTP packets with relative payload types are defined. In these special-purpose packets, the content of payloads and/or the values in the "payload type" field in the RTP header are used as embedded signalling. More generally; the same type of embedded signalling can also be applied to another type of real time voice packets in the IP or another protocol environment.

Figure 4:
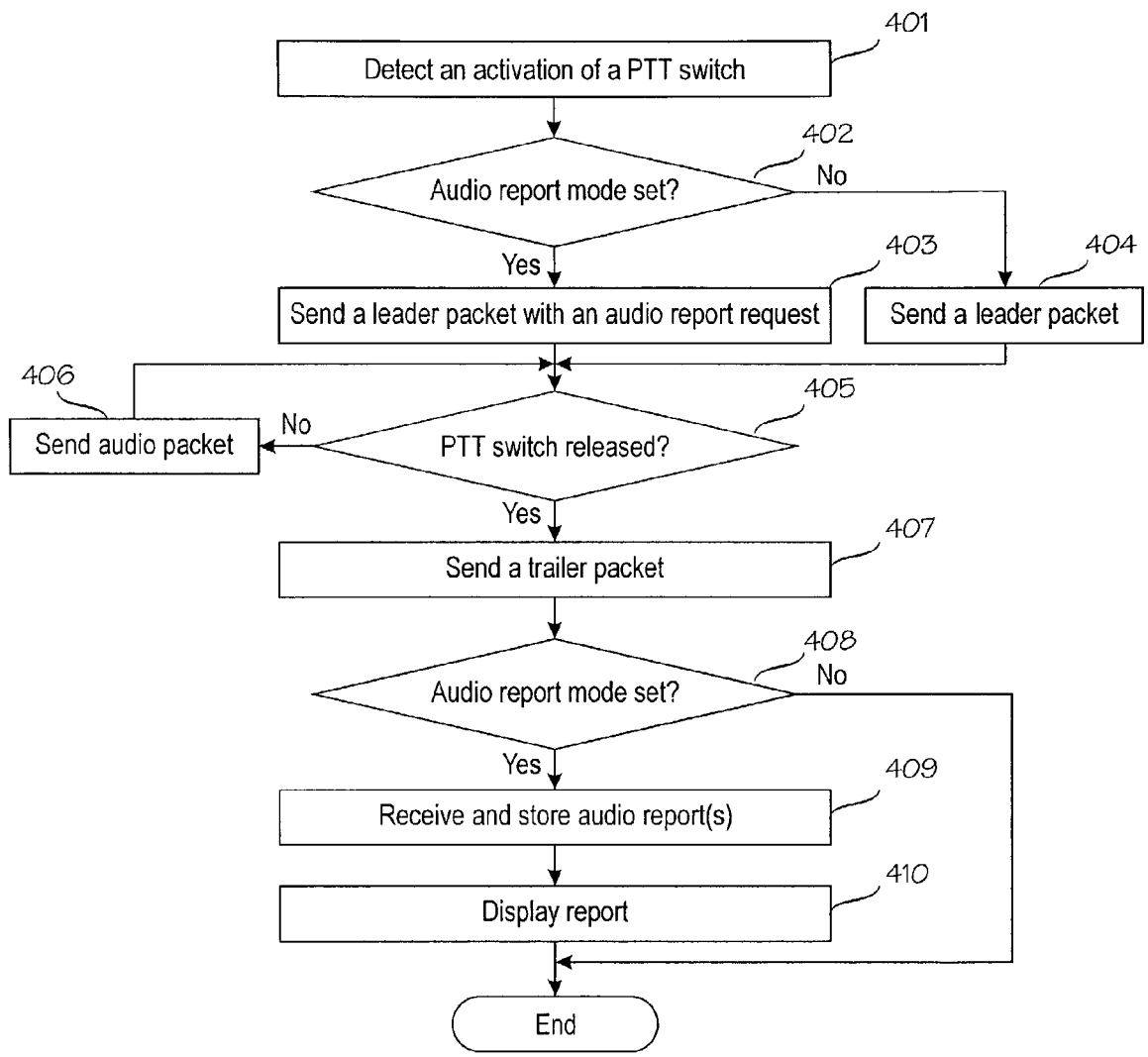
FIG. 4 is a flow diagram illustrating an example of the operation of a user terminal from which a speech item originates.

An example of the operation of a sending user terminal (a calling party), e.g. MS, is illustrated in FIG. 4. The user pushes the PTT pressel 306 which is detected by the controller 305 (step 401). The controller 305 signals a speech item request to the mobile RAN, thereby asking a dedicated radio bearer for the duration of the entire speech item. The mobile RAN grants the uplink bearer (e.g. a dedicated packet data channel and the physical time slot). When the mobile RAN acknowledges the allocation of the uplink bearer, the mobile starts sending data there through. Firstly, the controller checks from an internal memory whether an audio report mode is set in the user terminal (step 402). Examples of how the user can set audio report mode are described below. The first packet to be sent is an RTP message containing the talking party mnemonic identifier. If the audio report mode is set, the leader packet also contains an audio report request (step 403). Examples of a leader packet with audio report request are described below. If the audio report mode is not set, the leader packet is sent without the audio report request (step 404). The leader packet is followed by voice stream packets (audio packets, such as VoIP packets) until the PTT pressel is released (steps 405 and 406). When the controller 305 detects that the PTT 306 is released, the controller 305 sends a trailer packet (step 407) and the uplink voice bearer is released. Thus, in this embodiment, the speech item is divided into three parts: a leader RTP packet, audio RTP packet(s) and a trailer RTP packet. The leader packet contains embedded signalling for the call. The audio packet may have no signalling but only the parts of the speech. The trailer packet is the last part of the speech item and contains some embedded signalling. In an embodiment of the invention, no trailer packet is sent but the called party detects the end of the speech item otherwise. The controller checks whether the audio report mode is set (step 408). If not, the process ends. If the audio report mode is set, the controller 305 waits for the audio report(s) and stores received audio report(s) (step 409). An example of an audio report is described below. The controller 305 displays the report(s) or information derived from it/them on the display (step 410). The displayed information typically contains at least information indicating the identity of the recipient(s) of the speech item. Thus, the user can see which group members received the previous speech item(s).

The leader RTP packet and the VoIP packets are routed to the U-UPF of the user on the basis of the active GPRS context. The U-UPF of the calling party sends packets to the U-UPF of the called party. The downlink bearer in the radio interface of the mobile network is allocated by the SGSN when it detects an IP packet travelling via an existing context to a mobile station MS. Firstly, the SGSN pages the MS if it is in a STANDBY state. After receiving an acknowledgement from the MS, the SGSN requests that the RAN (e.g. the GSM BSS) allocates a dedicated radio bearer, and after the allocation the SGSN starts sending packets (e.g. in LLC frames) to the RAN. The RAN sends the packets (e.g. in radio blocks) to the MS.

Similarly, the leader RTP packet and the following VoIP packet can be routed via any communication system between the calling party and the receiving party or parties, as illustrated in FIGS. 6 and 7. It should be appreciated that in some embodiments of the invention, the transit network has no part in the inventive functionality. The intermediate communication system(s) only provide(s) a communication "pipe" between the end users.

Figure 5:
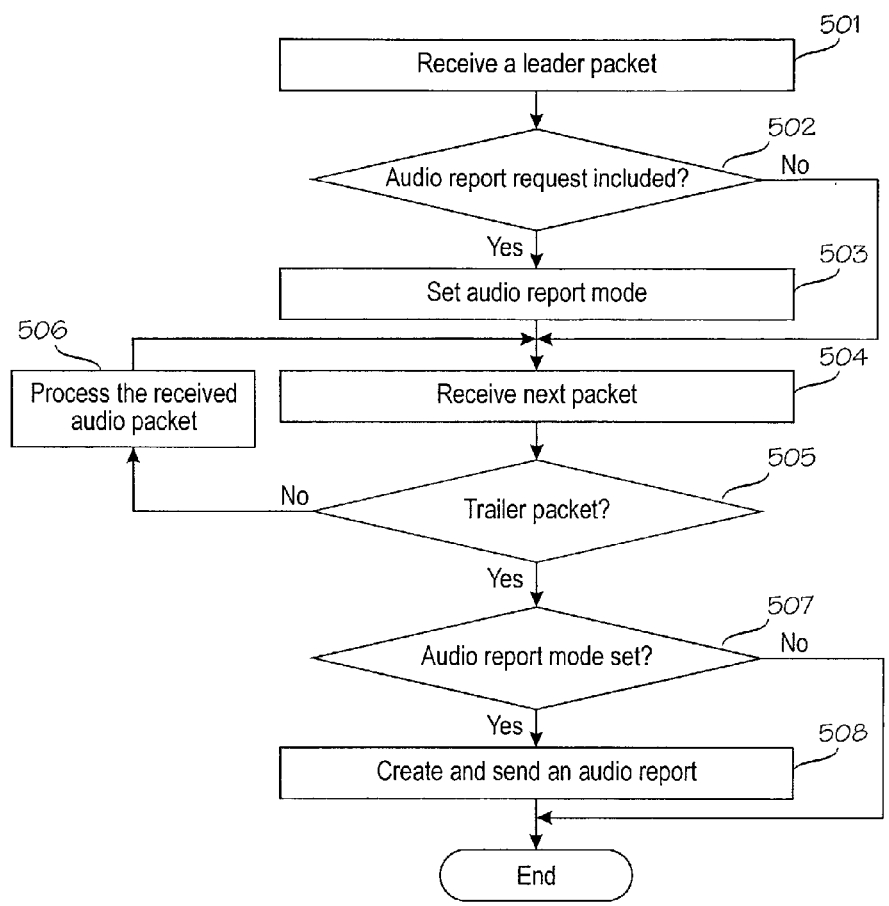
FIG. 5 is a flow diagram illustrating an example of the operation of a user terminal which receives a speech item.

An example of the operation of a receiving user terminal (a called party), e.g. MS, is illustrated in FIG. 5. The controller 305 observes that a leader packet is received (step 501). The controller 305 checks whether the received leader packet contains an audio report request (step 502). If the request is not present, the controller 305 proceeds to receive next packet (i.e. VoIP packet). However, if the audio report request is present, the controller sets an audio report mode. In the audio report mode, the controller process of the received audio packets so that it contains the information required for building up the audio report as requested. Then the controller 305 receives and processes audio packets until a trailer packet is received or the end of speech item is otherwise detected, e.g. by not receiving a new packet from the same calling party (steps 504, 505 and 506). After detecting the end of the speech item, the controller 305 checks whether the audio report mode is set (step 507). If not, the process ends. It the audio report mode is set, the controller creates the audio report as requested and sends the report to the calling party (step 508). The report may be sent as embedded signalling in the user plane, e.g. in a packet similar to the leader packet, or as outband signalling in the control plane, e.g. SIP signalling.

In some embodiments of the invention, the audio reports are forwarded through the communication system to the calling party without any processing by the communication system 12, as illustrated in FIG. 6. This allows the present invention to be implemented in the user terminals only, and therefore no special infrastructure functions are needed for the invention. The disadvantage is the extra transmission capacity needed in both uplink and downlink directions.

In some other embodiments of the invention, the communication system 12 intercepts the group call related audio processing reports from the receiving parties and sends only one combined report to the calling party, as illustrated in FIG. 7. These embodiments require less transmission capacity but, on the other hand, they require a special functionality in the infrastructure. The entity collecting the reports may be the bridge 10 or the U-UPF of the calling party if the embedded signalling is employed for the reports. If the outband signalling, such as SIP, is employed, the entity collecting the reports may be the call processing server 11 or the U-CPF of the calling party.

In an embodiment of the invention, the user can set the user terminal in an audio report mode from the user interface, e.g. using a specific button or a menu. For example, an audio report activation menu shown in FIG. 8 may be displayed to the user. The user can select between several different report options which affect the contents of the report request, the contents of the audio report, and/or the information displayed to the user. In the example shown in FIG. 8, the options selectable for the content of the audio report include:

- indicate the verdict of reception, e.g. OK/FAILED. This gives ON/OFF (two state) information on the success of reception.
- indicate the total number of received packets. This information represents the quality of the communication, providing a kind of QoS value for the end-to-end connection.
- Indicate the number of invalid packets. This information also represents the quality of the communication, providing a kind of QoS value for the end-to-end connection.
- Send report after successful reception. For example, a report is. sent after reception of a trailer packet. It should be noted that successful reception may contain invalid packets.
- Send report after reception failure. The reception may be determined to be unsuccessful if the number of invalid packets exceeds a threshold or a trailer packet is missing, for example.

The terminal always sends a request for the audio report when the report mode is active. In an embodiment of the invention, the audio report mode is active until the user deactivates it. In another embodiment, the mode is inactive as a default, and the mode must be activated after switching on the terminal, for example.

Examples of acknowledgement reports are illustrated in FIG. 9. In the top left corner there is an acknowledgement report request similar to that shown in FIG. 8. All acknowledgement options have been selected. The sending user presses the PTT to start the speech item and a respective acknowledgement report request is transmitted to the recipients as described above. The sending user ends the speech item and the recipients transmit acknowledgement reports as described above. On the basis of the acknowledgement reports, the mobile station of the sending user creates and displays to the user an acknowledgement report which may have a format shown in the rightmost part of FIG. 9. The report may include the name of the report, e.g. "Acknowledgement report", the name of the group, e.g. "Design team", and various fields relating to the recipient group members, such as "Member" field, "Status" field, and "Quality" field. The "Member" field indicates the names of the group recipients. The "Status" field contains an indicator indicating whether the reception of the previous speech item was successful (the indicator +) or unsuccessful (the indicator −) for the specific recipient, while an empty status field indicates that no report was received from the recipient. The "Quality" field gives a value representing the quality of the end-to-end connection, e.g. the number of invalid packets/total number of packets*100. In FIG. 9, the report 1 indicates that all group members received the first speech item successfully. The report 2 indicates that the next speech item was successfully received by John, Adam and Eve but no report was received from Mary and Matt. The report 3 indicates that the third speech item was successfully received by all recipients except Matt.

Figure 10:
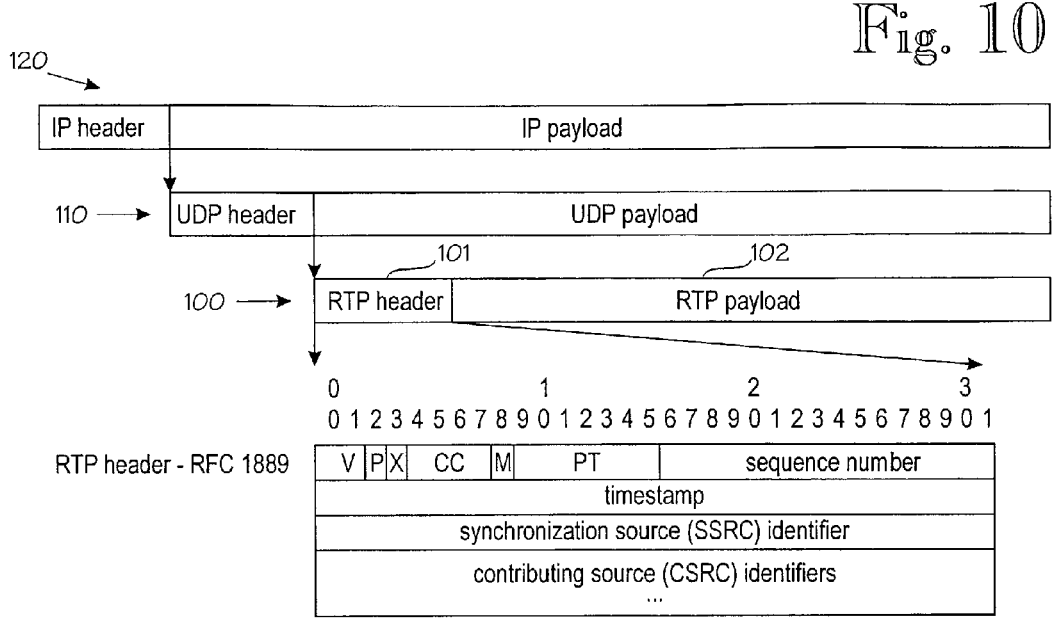
FIG. 10 shows an example of an RTP packet encapsulated into UDP and IP packets.

FIG. 10 illustrates an example of an RTP packet 100 encapsulated into the payload of an UDP packet 110. The UDP 110 packet is further encapsulated into the IP payload of the IP packet 120. This approach is in accordance with the RTP/UDP/IP protocol stack commonly used in the VoIP world for real-time audio data transmission. The RTP packet 100 includes the RTP header 101 and the RTP payload 102. The RTP header 101 is basically in accordance with the RFC 1889. The RTP header 101 includes the following fields and parameters, V, P, X, CC, M, PT, sequence number, time stamp, synchronization source (SSRC) identifier, contributing source (CSC) identifiers, etc. In an embodiment of the present invention, the field PT having a value 105 indicates that the RTP payload 102 contains embedded control signals for the PoC.

Figure 11:
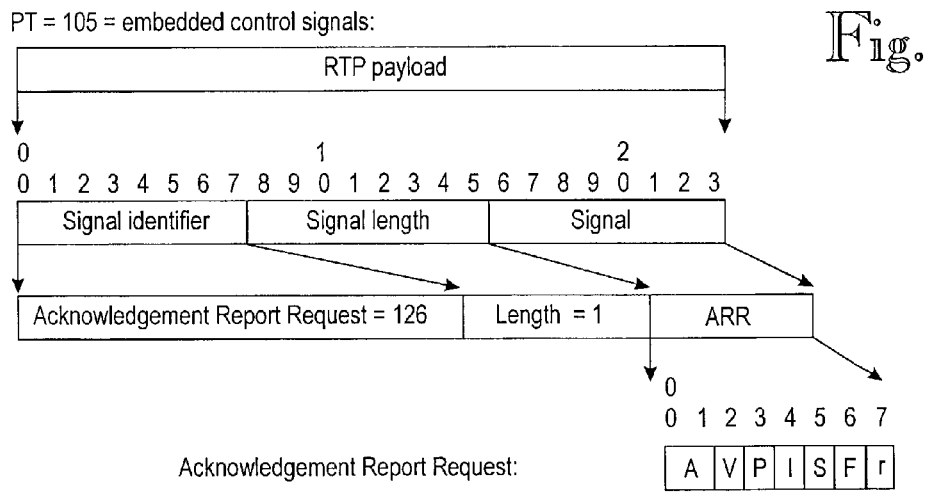
FIG. 11 shows an example of an RTP leader packet containing an acknowledgement report request.

FIG. 11 illustrates an example of an RTP leader packet containing an acknowledgement report request according to the present invention. Firstly, the value of the field PT is 105, indicating that the RTP payload contains embedded control signals. The control signal includes a signal identifier field, a signal length field, and a signal field. In the example, the value of the signal identifier field is 126, indicating that the signal is an acknowledgement report request. The signal length field indicates that the length of the signal is one byte. The signal ARR (Acknowledgement Report Request) consists of parameters A, V, P, I, S, F, and r. The one-bit parameter A indicates the version of the acknowledgement report request, e.g. the value 00=version 1. The one-bit fields V, P, I, A, and F correspond to the options selectable in the audio report request menu shown in FIG. 8. When the value of the parameter is 0, the respective option is inactive (OFF), and when the value is 1, the respective option is active (ON). The parameter r is reserved for a future use and has a default value 0. The sending MS sets the values of the parameters according to the user selection in the audio report request menu, and transmits the leader packet with the ARR in the beginning of the each speech item, for example. Upon receiving the leader packet with the ARR, the receiving MS configures the acknowledgement mode in accordance with the values of the received parameters.

Figure 12:
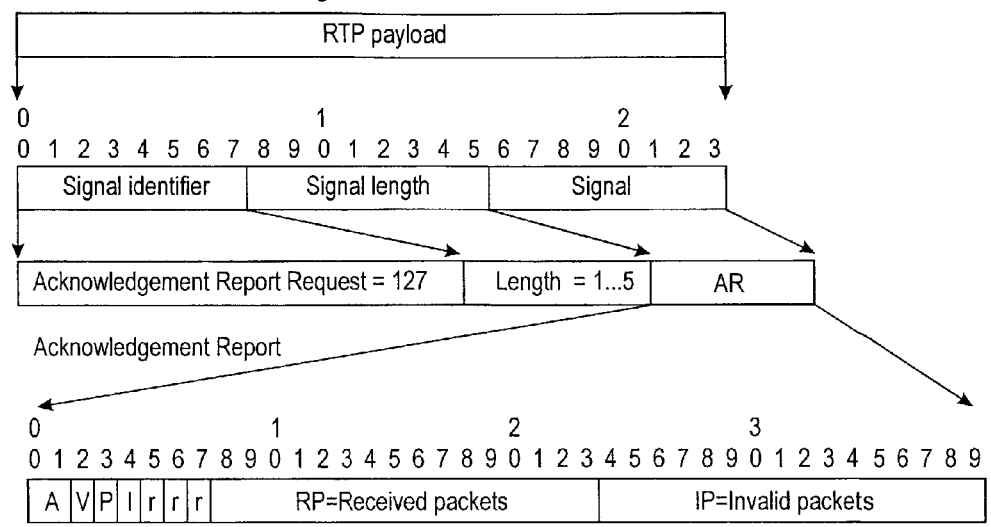
FIG. 12 shows an example of an RTP packet containing an acknowledgement report.

FIG. 12 illustrates an example of an acknowledgement report packet sent as an embedded control signal in the RTP payload. Again, the value of the field PT is 105, indicating that the RTP payload contains embedded control signals. The value of the signal identifier field is 127, indicating that the signal is an acknowledgement report AR. The signal length has a value 1-5, depending on how many of the acknowledgement report options are active. The acknowledgement report field AR contains the parameters A, V, P, I, r, RP, and IP. The two-bit field A indicates the version of the acknowledgement report, e.g. the value 00 indicates the version 1.0. The one-bit parameter V indicates the verdict of the reception, e.g. 0=unsuccessful, 1=OK. The one-bit field P indicates whether the report of received packets is included (V=1) or not (V=0). The one-bit field V indicates whether the report of invalid packets is included (V=1) or nor (V=0). The 16-bit field RP contains the total number of received packets, being capable of indicating 0 . . . 65535 speech packets. The 16-bit field IP indicates the number of invalid packets, being capable of indicating 0 . . . 65535 speech packets. The one-bit fields r are reserved for a future use and have a default value 0. The receiving MS sends the RTP packet to the sending MS after each speech item. The sending MS analyzes the contents of the received acknowledgement report(s) and creates and displays a report of a type shown in FIG. 9, for example.

On the basis of the above description, the embodiments for other type of real-time data items will be obvious to a person skilled in the art. For example, a real-time video item can be transported with the Real-Time Transport Protocol (RTP) in a similar manner as described for the real-time audio (speech) above. Still further, a real-time multimedia items containing, for example, real-time audio and video, can be transported using the principles described above.

In an embodiment of the invention, the reporting is made using graphical presentations, such as symbols representing the recipients. The successful/unsuccessful reception of the real-time data item may be indicated by colour, type and/or shape of the symbol, for example. In a still further embodiment, the successful/unsuccessful reception is indicated by an audible alarm or an oral announcement, such as "Maft failed to acknowledge" or "Everyone acknowledged".

The description only illustrates some embodiments of the invention. The invention is not, however, limited to these examples, but it may vary within the scope and spirit of the appended claims.

The invention claimed is:

1. A method comprising:
sending, by utilizing internet protocol communication, a real-time audio data item from a terminal of a sending party to a terminal of at least one receiving party over a communication system, said real-time audio data item comprising a plurality of real-time audio data packets, wherein the sending of the real-time audio data item includes sending of data packets containing real-time audio data information and sending real-time audio data transport packets;

sending, in association with the sending of the real-time audio data item, to the least one receiving party, a request to send an acknowledgment report;

sending, responsive to the request, by utilizing internet protocol communication, an item acknowledgement report from the terminal of each of the at least one receiving party after the end of the real-time audio data item, wherein the item acknowledgement report is sent as embedded signaling within real-time audio data traffic and;

initiating the sending of the real time audio data item by sending a leader packet from the terminal of the sending party to the terminal of the at least one receiving party over the communication system, wherein;

the leader packet contains the request to send the acknowledgement report, the terminal of the sending party sends data packets containing real-time audio data information, the terminal of the at least one receiving party detects the end of the real-time data item, and the terminal of the at least one receiving party, responsive to receiving the request in the leader packet and detecting the end of the real-time audio data item, sends the acknowledgement report to the terminal of the sending party.

2. The method of claim 1, the method further comprising sending a request for a real-time audio data item from the terminal of the sending terminal to the communication system, the request for real-time audio data item including said request to send the acknowledgement report.

3. The method of claim 1, wherein the embedded signalling includes real-time transport packets having specific payload types.

4. The method of claim 1, wherein the detecting includes receiving a trailer packet.

5. The method of claim 1, further comprising:
displaying, on a display in the terminal of the sending party, real-time audio data item information provided on the basis of the received acknowledgement report or reports, wherein the displaying comprises displaying at least identification information relating to the at least one receiving party which sent the acknowledgement report for the real-time audio data item.

6. The method of claim 1, wherein the real-time audio data includes speech.

7. A method comprising:
sending, by utilizing internet protocol communication, data packets of a real-time audio data item to at least one receiving terminal, said real-time audio data item comprising a plurality of real-time audio data packets, wherein the sending of the real-time audio data item includes sending of data packets containing real-time audio data information and sending real-time audio data transport packets;

sending, in association with sending the real-time data packets of the real-time audio data item, to the at least one receiving party a request to send the acknowledgement report;

receiving, responsive to the request, by utilizing internet protocol communication, an acknowledgement report originating from the at least one receiving party after terminating the real-time audio data item, wherein the item acknowledgement report is sent as embedded signaling within real-time audio data traffic; and initiating the sending of the real time audio data item by sending a leader packet from the terminal of the sending party to the terminal of the at least one receiving party over the communication system, wherein;

the leader packet contains the request to send the acknowledgement report, the terminal of the sending party sends data packets containing real-time audio data information, the terminal of the at least one receiving party detects the end of the real-time data item, and the terminal of the at least one receiving party, responsive to receiving the request in the leader packet and detecting the end of the real-time audio data item, sends the acknowledgement report to the terminal of the sending party.

8. The method of claim 7, wherein said acknowledgement report is a combined acknowledgement report derived by a network element of a communication system from acknowledgement reports received from at least two receiving parties.

9. The method of claim 8, comprising displaying on a display of the user terminal real-time audio data item information provided on the basis of the received acknowledgement report or reports, wherein said displaying includes displaying at least identification information relating to the at least one receiving party which sent the acknowledgement report for the real-time audio data item.

10. The method of claim 7, wherein the real-time audio data includes speech.

11. The method according to claim 7, comprising sending a trailer packet in order to indicate an end of the real-time audio data item.

12. The method of claim 7, comprising sending a leader packet initiating the sending of the real-time audio data item, the leader packet containing the request to send the item acknowledgement report after an end of the real-time audio data item.

13. A user terminal for communicating real-time data items, the user terminal comprising:

(A) for a sending mode of operation:

a mechanism that sends, by utilizing internet protocol communication, a leader packet comprising a real-time transport packet to at least one receiving terminal over a communication system in order to initiate the sending of the real-time data item, the leader packet containing the request to send an item acknowledgement report, said real-time data item comprising a plurality of real-time data packets;

a mechanism that sends, by utilizing internet protocol communication, real-time transport packets containing real-time data of the real-time data item to the at least one receiving terminal;

a mechanism that sends, by utilizing internet protocol communication, a trailer packet in form of a real-time transport packet in order to indicate the end of the real-time data item;

a mechanism that receives an acknowledgement report originating from the at least one receiving party by utilizing internet protocol communication;

a mechanism that displays item information provided on the basis of the received acknowledgement report, and (B) for a receiving mode of operation:

a mechanism that receives, by utilizing internet protocol communication, real-time data packets of a real-time data item from a sending terminal over the communication system;

a mechanism that receives, by utilizing internet protocol communication in association with the received real-time data packets of the item, a request to send an item acknowledgement report;

a mechanism that detects an end of the item; and a mechanism that sends, responsive to receiving said request and detecting the end of the item, an acknowledgement report by utilizing internet protocol communication.

14. A communication system, comprising a first terminal that sends, by utilizing internet protocol communication, real-time communication packets relating to a real-time audio item and addressed to a group communication group, said real-time audio data item comprising a plurality of real-time communication packets;

a group communication network entity providing group specific communications functions so that any real-time communication packet addressed to a communication group is multiplied and unicast, by utilizing internet protocol communication, to each receiving member in the respective group communication group on the basis of their individual addresses;

at least one second terminal that sends a real-time audio data item acknowledgement report to the first terminal by utilizing internet protocol communication after an end of a received real-time audio data item; and a user communication network entity providing user-specific communications functions, wherein any group-related communication from a user managed by said user communication network entity being first routed to said user communication network entity and then forwarded to the group communication network entity, and any unicast real-time audio data packet from said group communication network entity being first routed to said user communication network entity prior to sending the unicast real-time audio data packet to the respective user.

15. The communication system of claim 14, wherein the real time audio data includes speech.

* * * * *